US012785526B2

(12) United States Patent
de Swardt et al.

(10) Patent No.: US 12,785,526 B2
(45) Date of Patent: Nov. 3, 2026

(54) ELIMINATING WIND GENERATOR INTER-TURN FAILURES WINDING IMPROVEMENT

(71) Applicant: Timken Gears & Services Inc., King of Prussia, PA (US)

(72) Inventors: Jan de Swardt, Eustis, FL (US); Randall W. Russell, Kennewick, WA (US)

(73) Assignee: Timken Gears & Services Inc., King of Prussia, PA (US)

( * ) Notice: Subject to any disclaimer, the term of this patent is extended or adjusted under 35 U.S.C. 154(b) by 144 days.

(21) Appl. No.: 18/959,055

(22) Filed: Nov. 25, 2024

(65) Prior Publication Data

US 2025/0096659 A1 Mar. 20, 2025

Related U.S. Application Data

(62) Division of application No. 18/435,354, filed on Feb. 7, 2024, now Pat. No. 12,206,298.

(60) Provisional application No. 63/486,819, filed on Feb. 24, 2023.

(51) Int. Cl.

| | |
|---|---|
| ***H02K 15/00*** | (2025.01) |
| ***F03D 80/50*** | (2016.01) |
| ***H02K 3/28*** | (2006.01) |
| ***H02K 7/18*** | (2006.01) |
| ***H02K 15/50*** | (2025.01) |

(52) U.S. Cl.
CPC ............. *H02K 15/50* (2025.01); *F03D 80/50* (2016.05); *H02K 3/28* (2013.01); *H02K 7/183* (2013.01); *F05B 2230/80* (2013.01)

(58) Field of Classification Search
CPC .......... H02K 15/50; H02K 3/28; H02K 7/183; H02K 7/1838; F03D 80/50; F05B 2230/80
See application file for complete search history.

(56) References Cited

U.S. PATENT DOCUMENTS

2014/0230235 A1 8/2014 Allen et al.
2015/0061450 A1* 3/2015 Nakagawa .............. H02K 3/28 310/198
2022/0069644 A1 3/2022 Mongeau et al.

* cited by examiner

*Primary Examiner* — Joseph Ortega
(74) *Attorney, Agent, or Firm* — Michael Best & Friedrich LLP

(57) ABSTRACT

Methods for repairing electric machines, such as wind generators, and stators implemented thereof. One method includes replacing a first stator core with a second stator core, wherein the second stator core has fewer stator slots than the first stator core, and wherein the stator slots are configured to receive coil windings. The method includes increasing a number of coil turns forming each coil winding from a first value to a second value, wherein the first value is associated with the first stator core and the second value is associated with the second stator core. The electric machine with the second stator core has rated power output at least as high as the electric machine with the first stator core.

7 Claims, 8 Drawing Sheets

1000

| DESCRIPTION | | | DESIGN | | UNIT OF MEASURE | CHANGE |
|---|---|---|---|---|---|---|
| | | | 60-SLOT DESIGN | 48-SLOT DESIGN | | |
| | | | CURRENT REPAIRS | NEW ENGINEERED IMPROVEMENTS | | |
| OUTPUT POWER | | | 2400 | 2400 | kW | 0% |
| VOLTAGE | | | 750 | 750 | V | 0% |
| LOSSES | STATOR | CONDUCTOR | 19150 | 17770 | W | -7% |
| | | EDDY AND CIRCULATING CURRENT | 2353 | 1812 | W | -23% |
| | | TOTAL STATOR | 21503 | 19582 | W | -9% |
| | ROTOR | CONDUCTOR | 15468 | 12749 | W | -18% |
| | TOTAL | | 79043 | 76006 | W | -4% |

*FIG. 10*

ELIMINATING WIND GENERATOR INTER-TURN FAILURES WINDING IMPROVEMENT

CROSS-REFERENCE TO RELATED APPLICATIONS

This application is a divisional of U.S. patent application Ser. No. 18/435,354, filed Feb. 7, 2024, which claims priority to U.S. Provisional Patent Application No. 63/486,819, filed on Feb. 24, 2023, the entire contents of which are incorporated by reference herein.

SUMMARY

In the United States alone, over 7,000 wind generators rated to output 2.4 megawatts (MW) of power have been installed in the field. While the actual rating is 2400 kW, these generators are understood and referred to by practitioners as 2300 kW rated wind generators (or 2.3 MW). Accordingly, wind generators referred to herein may be referred to as 2.4 MW rated or 2.3 MW rated wind generators interchangeably. Even after such wind generators are upgraded by the original equipment manufacturer (OEM) and/or undergo aftermarket repairs, the mean time between failures experienced by the wind generators is 5-7 years. The end user expectation for mean time between failures is 15 years or more.

Inter-turn failures, or inter-turn shorts, are the primary cause for electrical failures experienced by the repaired 2.3 MW wind generators. While inter-turn shorts are a common failure mode for both general industrial motors as well as wind generators, causes for an inter-turn short differ slightly between industrial machines (for example, industrial motors and generators) and wind generators. In industrial machines, the inter-short failure is typically caused when variable-frequency drive installations in the plant and/or surges from a switchgear installation degrade the inter-turn insulation of the industrial machine. Such failures in industrial machines may be addressed by improving the inter-turn insulation when the machine's winding is replaced during a rewind. The phrase "electric machine" as used herein includes both electric motors and electric generators. The winding improvements described herein apply to stator windings of both motors and generators, including induction and synchronous AC machines.

Unfortunately, similar repair and/or upgrade techniques applied to wind generators are not effective in preventing inter-turn failures that are not attributed to end-of-lifetime, age related failures. For example, the wind generator repair industry has increased the inter-turn insulation on 2.3 MW wind generators to a significant quad film conductor covering with additional mica film turn tape. Although this enhancement to inter-turn insulation would be considered overkill for industrial machine applications, such improvements to the inter-turn insulation is still insufficient for preventing premature inter-turn failures in 2.3 MW generators.

Embodiments described herein provide a means to repair and/or improve high-power wind generators (for example, wind generators rated to output at least 2.3 MW of power). One example includes replacing the original OEM core with a new stator core having similar overall dimensions to remain compatible with the current frame design. In this example, the total number of stator slots may be reduced, increasing the number of turns. A trapezoidal wedge may be provided to hold coil windings within the stator slots.

In one aspect, the invention provides a method of repairing an electric machine. The method includes replacing a first stator core with a second stator core, wherein the second stator core has fewer stator slots than the first stator core, and wherein the stator slots are configured to receive coil windings. The method includes increasing a number of coil turns forming each coil winding from a first value to a second value, wherein the first value is associated with the first stator core and the second value is associated with the second stator core. The electric machine with the second stator core has a rated power output at least as high as the electric machine with the first stator core.

In another aspect, the invention provides a stator for an electric machine having a rating of at least 2.3 MW. The stator includes a plurality of stator slots configured to receive a plurality of coil windings, and a plurality of phases. Each phase includes a subset of the plurality of coil windings. The plurality of stator slots includes 48 stator slots. The plurality of coil windings includes 48 coil windings. The plurality of coil windings includes 48 coil windings. The 48 coil windings are grouped into 24 coil groups of 2 coil windings. The subset of the plurality of coil windings includes 8 coil groups.

Other aspects of the invention will become apparent by consideration of the detailed description and accompanying drawings.

BRIEF DESCRIPTION OF THE DRAWINGS

FIG. 10 illustrates a table comparing the performance of a 60-slot stator design and a 48-slot stator design.

Other aspects of the embodiments described herein will become apparent by consideration of the detailed description.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
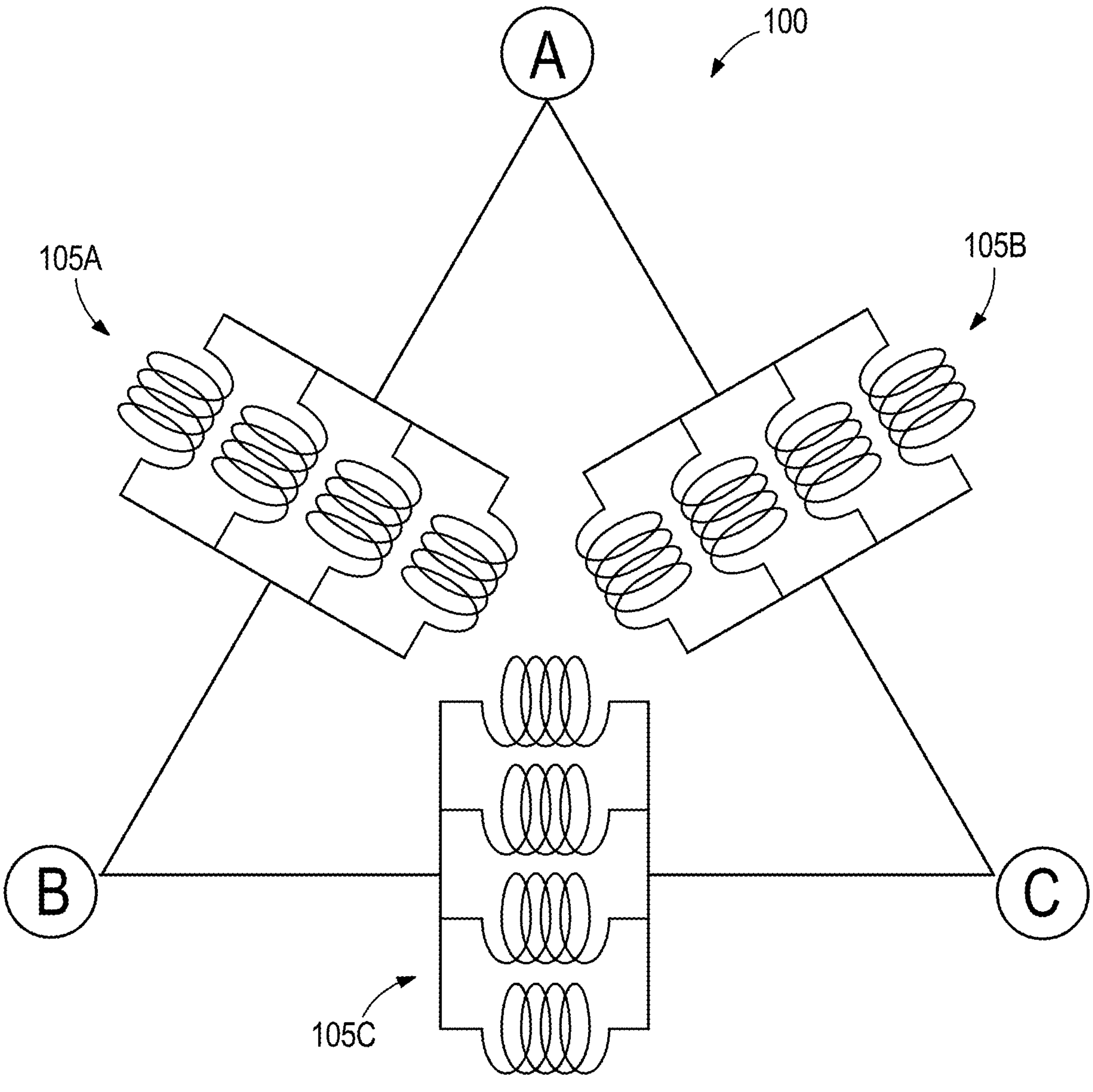
FIG. 1 illustrates an example stator configuration according to some embodiments of the present disclosure, in the form of a winding diagram.

FIG. 1 illustrates an example circuit diagram 100 of a stator configuration that may be included in a typical 2.3 MW wind generator (e.g., an electric machine). In the illustrated example, the wind generator is comprised of three phases 105A, 105B, 105C. The wind generator is a four-pole wind generator connected in delta with four coil windings (also referred to as coils or stator windings) connected in parallel. The stator of the wind generator (not shown) includes 60 coil windings and 60 slots that receive the coil windings, which can be divided into 12 groups of 5 coil windings each. Equation 1 below provides an expression for calculating the volt per turn value of a stator coil included in the wind generator of FIG. 1, where $v_{turn}$ is the calculated volts per turn, $V_{Stator}$ is the stator voltage in volts (V), α is factor for the connection type (α equals 1 for a delta connection or 1/√3 for a star connections), ph is the number of phases, c is the number of parallel circuits, s is the number of stator slots, and t is the number of turns per coil.

$$v_{turn} = \frac{V_{Stator} \cdot \alpha \cdot ph \cdot c}{s.t} \qquad \text{(Equation 1)}$$

At a stator voltage of 750V, the volts per turn value of the wind generator circuit illustrated in FIG. 1 is 37.5 V/turn. For industrial applications, 37.5 V/turn is considered to be relatively low, and thus, insulation including a single glass over film covering per coil turn could be used to adequately protect the stator coils against failures as a result of inter-turn shorts. However, for wind generator applications, OEMs and the repair industry implement quad film insulation on parallel stator conductors that is rated for 50 V/turn. An additional layer of mica tape is also added to the coil turn section to provide a combined stator turn insulation that is rated to 90 V/turn. Furthermore, the insulation that is typically used to protect the stator in a 2.3 MW wind generator has a main wall insulation stress level rating of around 2.5 kV/mm. The coil main wall insulation experiences stress levels of only 0.94 kV/mm during operation, well below the main wall insulation stress level rating of around 3 kV/mm.

Figure 2:
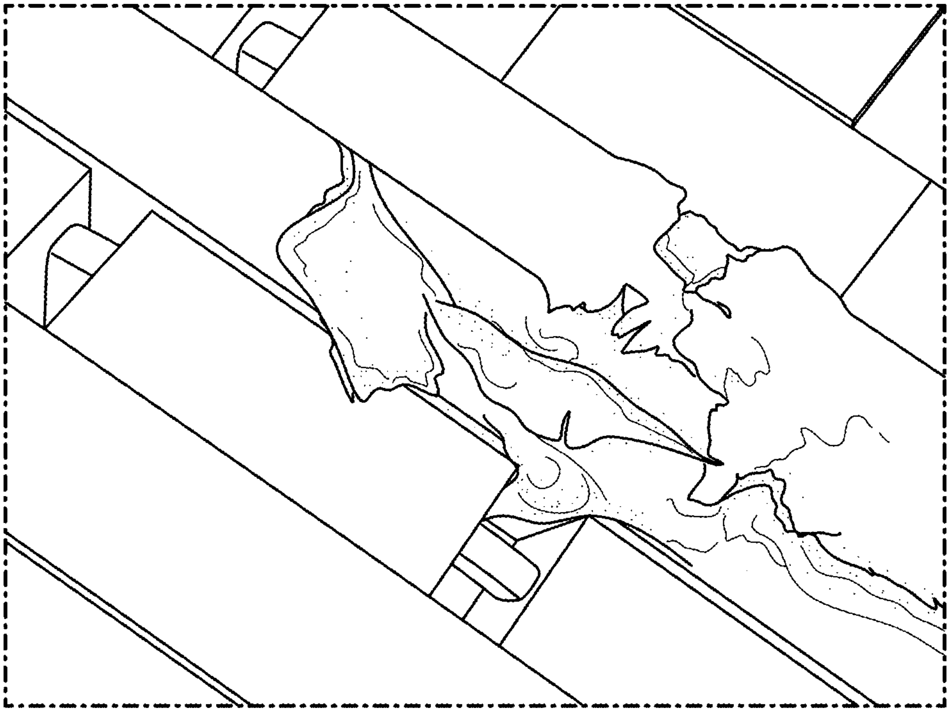
FIG. 2 illustrates a view of an example stator winding failure.
Figure 3:
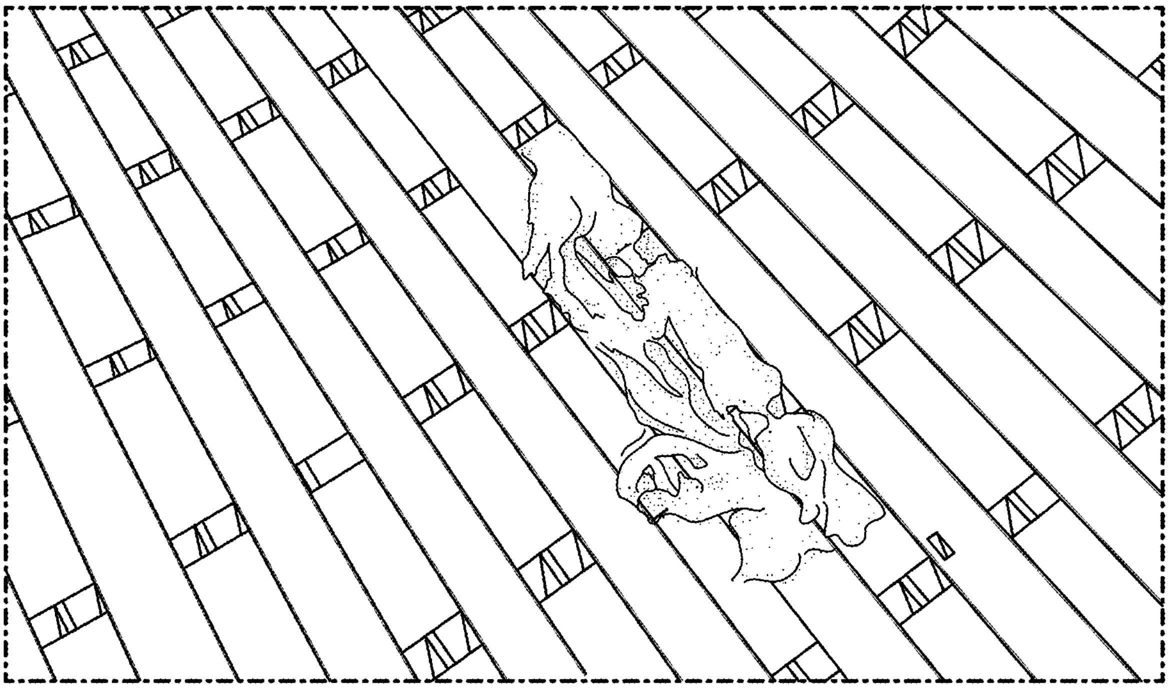
FIG. 3 illustrates a view of example core damage due to stator winding failure.

Despite the extra insulation that is implemented in the stators of 2.3 MW wind generators, as described above, the mean time between failures is 5-7 years. FIG. 2 illustrates a close-up view of a typical failure occurs in a stator winding of a 2.3 MW wind generator. FIG. 3 illustrates an example of damage to a stator core, which is caused by stator coil failures, that is severe enough to warrant replacement of the stator core. Thus, an improved stator winding design that prevents such inter-turn coils failures is desired.

During operation, the stator included in a 2.3 MW wind generator experiences various types of losses, such as stator copper losses. In addition to typical stator copper losses (also known as $I^2R$ losses), stator designs that include less than six turns per coil may also experience circulating and eddy current losses induced into the stator conductors. Equation 2 below provides an expression for the total stator copper losses experienced by a wind generator, in which $P_{Cu}$ is the total stator copper losses in Watt per phase, $P_{I2R}$ is the stator copper losses ($I^2R$) in Watt per phase, $k_s$ is a first per unit eddy current loss factor (dimensionless), $m_c$ is the reduction factor for use of a transposition (dimensionless), and $k_c$ is a second per unit eddy current loss factor (dimensionless).

$$P_{Cu} = P_{I2R} + P_{I2R} \cdot (k_s + m_c \cdot k_c) \qquad \text{(Equation 2)}$$

Equation 3 below provides an expression for a first dimensionless per unit eddy current loss factor, in which $k_s$ is the first per unit eddy current loss factor, $L_g$ is the gross stator core length in inches, $n_d$ is the number of stator radial air vents, $w_d$ is the average width of each stator radial air vent in inches, MLT is the stator coil mean length of a turn in inches, $w_{oc}$ is the net sum of width of all parallel conductor widths in inches, $w_s$ is the width of stator slot in inches, and $d_{oc}$ is the net sum thickness of all conductors in slots (both coils) in inches, $d_c$ is the average thickness of conductor in inches, and f is frequency in Hertz.

$$k_s \approx 6 \cdot \frac{2 \cdot L_g - n_d \cdot w_d}{MLT} \cdot \left(\frac{w_{oc}}{w_s} \cdot d_{oc} \cdot d_c\right)^2 \cdot \left(\frac{f}{60}\right)^2 \qquad \text{(Equation 3)}$$

Equation 4 below proves an expression for a second dimensionless per unit eddy current loss factor in which $k_c$ is the second per unit eddy current loss factor, $n_t$ is the number of parallel vertical conductors per turn (dimensionless), $L_g$ is the gross stator core length in inches, $n_d$ is the number of stator radial air vents, $w_d$ is the average width of each stator radial air vent in inches, MLT is the stator coil mean length of a turn in inches, and $k_s$ is the first per unit eddy current loss factor (dimensionless).

$$k_c \approx 0.1867 \cdot (n_t)^2 \cdot \frac{2 \cdot L_g - n_d \cdot w_d}{MLT} \cdot k_s \qquad \text{(Equation 4)}$$

Figure 4:
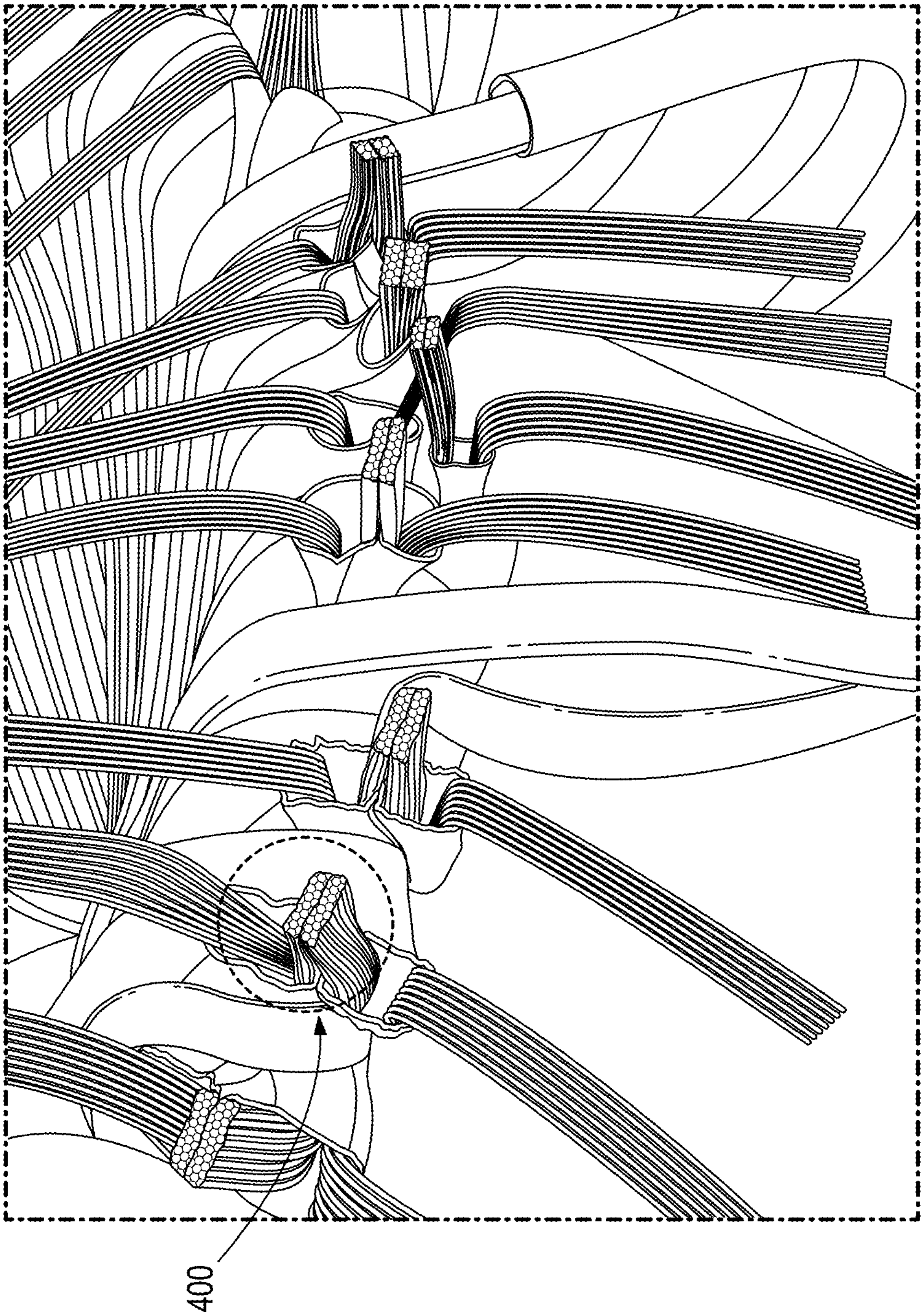
FIG. 4 illustrates a view of an example inter-coil transposition according to some embodiments of the present disclosure.

To reduce the above-described copper and eddy current losses, OEMs of wind generators use an inter-coil transposition to form the inter-coil connections. FIG. 4 illustrates an example of an inter-coil transposition 400 used to form the inter-coil connections in the stator. Although inter-coil transpositions such as the ones illustrated in FIG. 4 are uncommon, they are effective in reducing the additional copper losses in wind generators to approximately 12%.

However, even with the inter-coil transpositions, the low number of turns in the stator windings still results in circulating and eddy currents that generate additional losses in the stator winding. Moreover, the circulating and eddy currents result in significantly higher voltages per turn between both the stator conductors in parallel and the turns in the coil thereby explaining the need for additional insulation to protect the stator winding. In addition, by including manual inter-coil transpositions in the stator winding, the amount of time taken to wind and connect a stator in the wind generator increases by over 25%. Accordingly, a new stator design that reduces copper, circulating, and eddy current losses without the use of inter-coil transpositions is desired.

Additionally, inter-coil transportations require a significant amount of labor during the rewind process. Should the inter-coil transpositions be eliminated (e.g., removed), the turns per coil can be increased. As the 4-pole generator includes a 4-circuit Delta connection, a new winding design is provided. While some existing designs may provide for a means of decreasing the number of turns even more, while increasing the conductor area (for instance by using a series Delta connection and single turn coil), these coils would need to contain a Roebel transpositions as commonly used in very large generator in order to significantly reduce higher circulating and eddy current losses due to the fewer turns. The cost of such coils would increase the repair cost by multiple orders of magnitude, which is undesirable.

Figure 5:
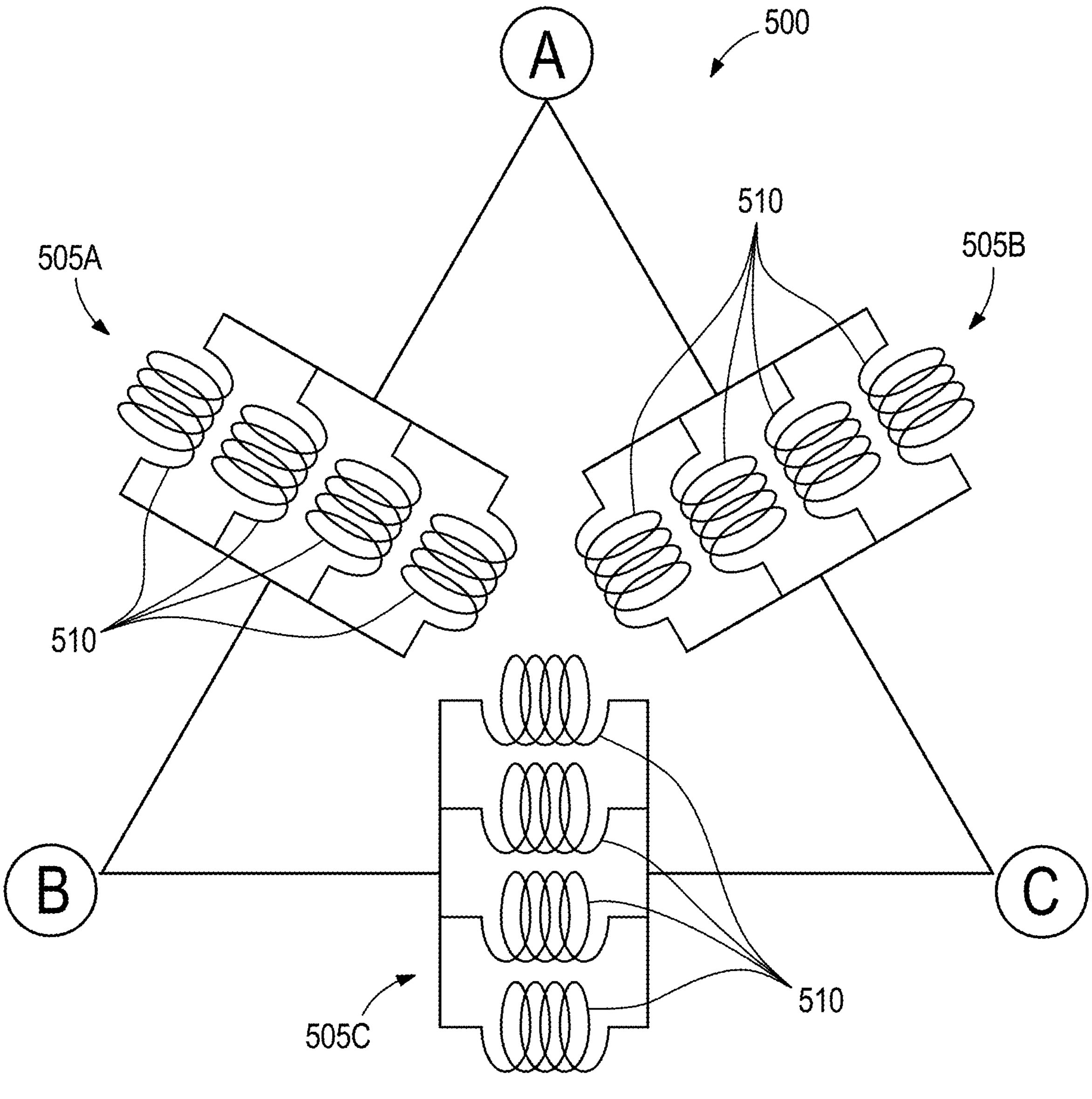
FIG. 5 illustrates an updated stator configuration according to some embodiments of the present disclosure, in the form of a winding diagram.

FIG. 5 illustrates an example circuit diagram 500 of an improved stator configuration to be included in a wind generator, such as a 2.3 MW wind generator described above. In the illustrated example, the wind generator is comprised of three phases 505A, 505B, 505C. The improved stator configuration uses the same core dimensions (e.g., outside diameter, core length and radial vents) as the existing OEM designs to remain compatible with the current frame design. However, the number of stator slots in the improved design is reduced from 60 slots to 48 slots. By reducing the number of stator slots from 60 to 48, the number of coil turns is increased from four to five, thereby reducing the circulating and eddy current as well as the induced potential difference between parallel conductors.

As shown in FIG. 5, the stator circuit winding of the improved design includes twelve groups of four coil windings each, or twelve coil groups 510. Each phase 505A, 505B, 505C of the stator circuit includes four of the coil groups 510. Each coil group 510 of four coils, however, may be further split into two groups of two coils each, thereby resulting in 24 groups of two. A stator winding circuit having 24 groups of two is no longer a four-circuit configuration. Rather, a stator winding configuration having 24 groups of two is an interleaved winding, and thus, may be wound as an eight parallel circuit delta connection. When the stator windings are wound as an eight parallel circuit delta connection, the number of coil turns is increased to ten turns per coil.

Figure 6:
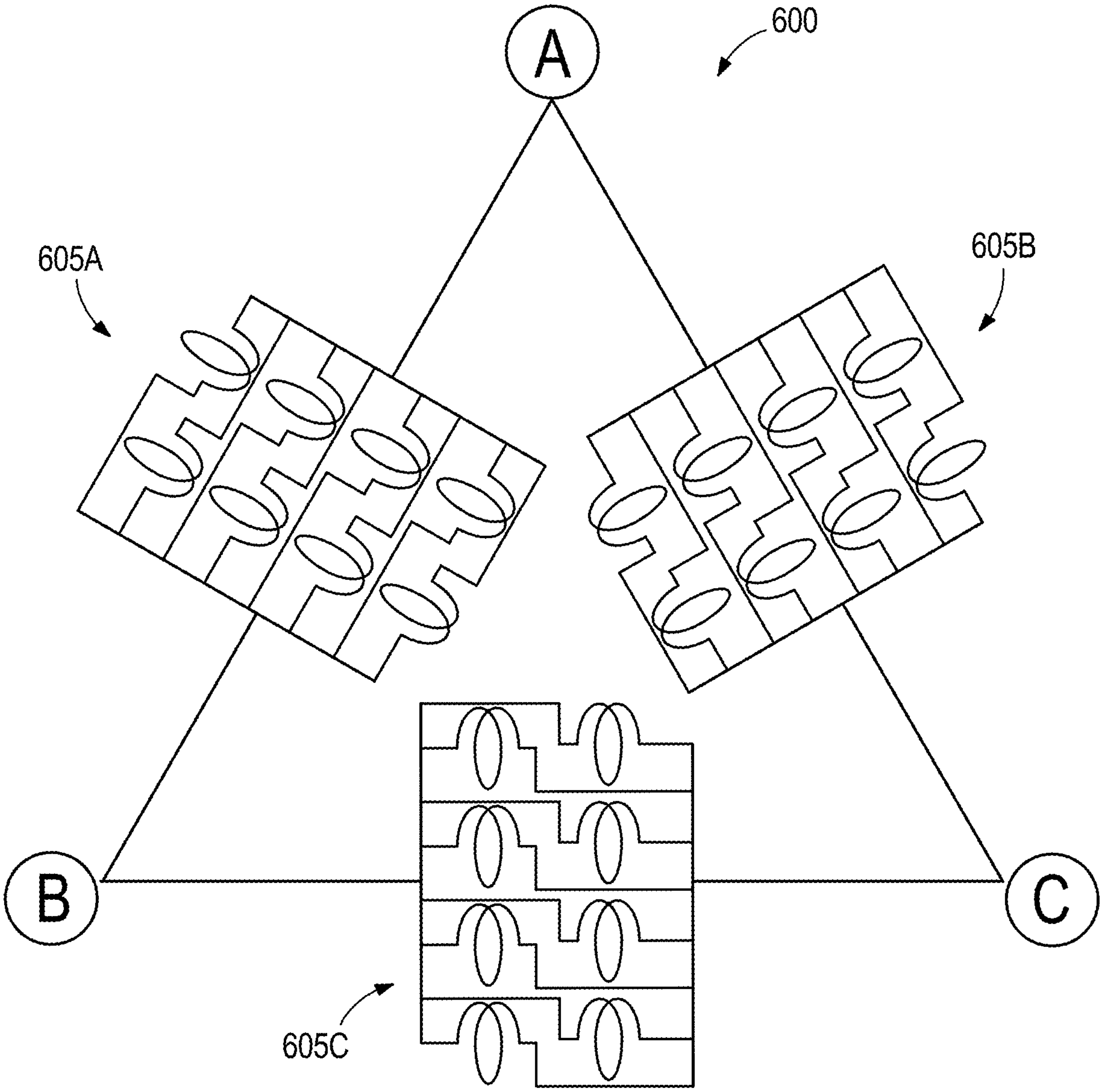
FIG. 6 illustrates an updated stator configuration according to further embodiments of the present disclosure, in the form of a winding diagram.

FIG. 6 illustrates an example circuit schematic 600 in which the improved stator design for a wind generator is wound with an eight parallel circuit delta connection having ten turns per coil. In the illustrated example, the wind generator is comprised of three phases 605A, 605B, and 605C. Such an interleaved stator winding configuration is impossible for a stator design that includes 60 coils, such as the existing OEM stator designs described above.

When Equations 2-4 are used to calculate the eddy and circulating currents, the eddy and circulating currents are reduced by 23% for the stator design of FIG. 6 compared to the original stator design of FIG. 1. This reduction is without the need for a time-consuming transposition connection, and thus the need for significant parallel conductor insulation and inter-turn insulation have been eliminated. Additional embodiments may thus further utilize standard conductor and turn insulation.

Additionally, the stator design of FIG. 6 results in the overall time to manufacture the coils and wind the stator being reduced by approximately 30%, as the reduced number of coils require less time to manufacture, the reduced number of coils requires less time to wind into the core, the elimination of the inter-coil transposition connection reduces the connection time, and the 24 group ends are connected directly to the terminal box buss-bars, greatly reducing the lead connection times.

Figure 7:
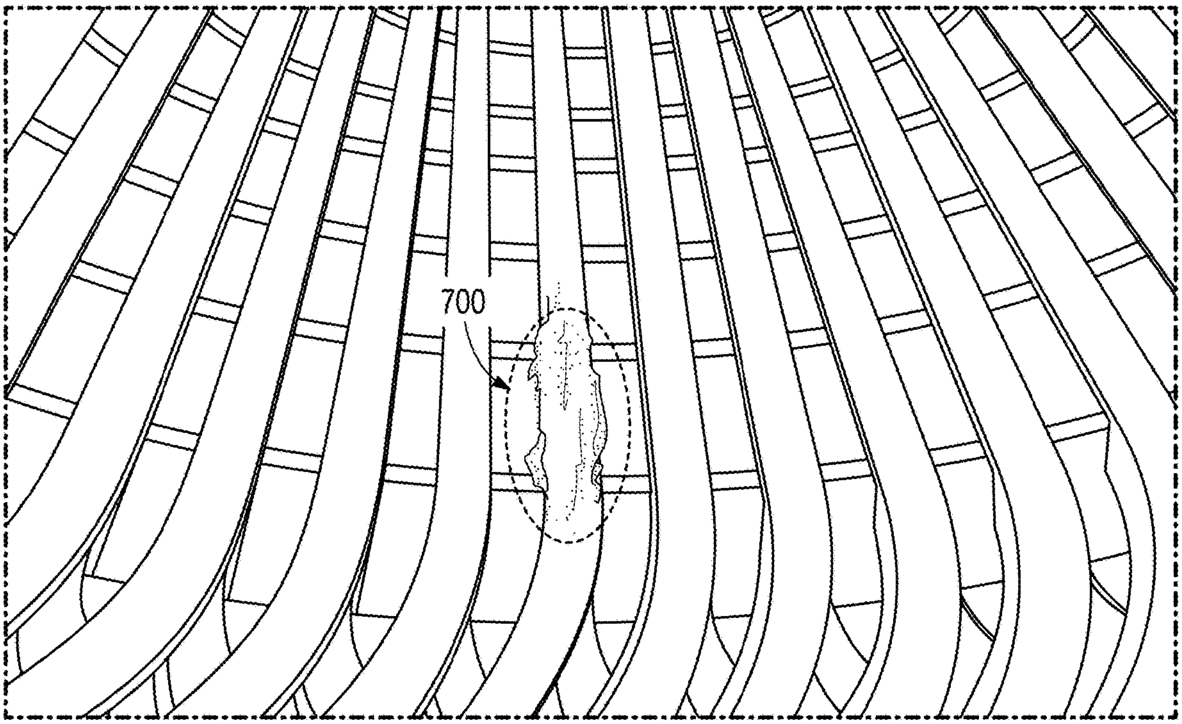
FIG. 7 illustrates a view of an example magnetic wedge failure.
Figure 8:
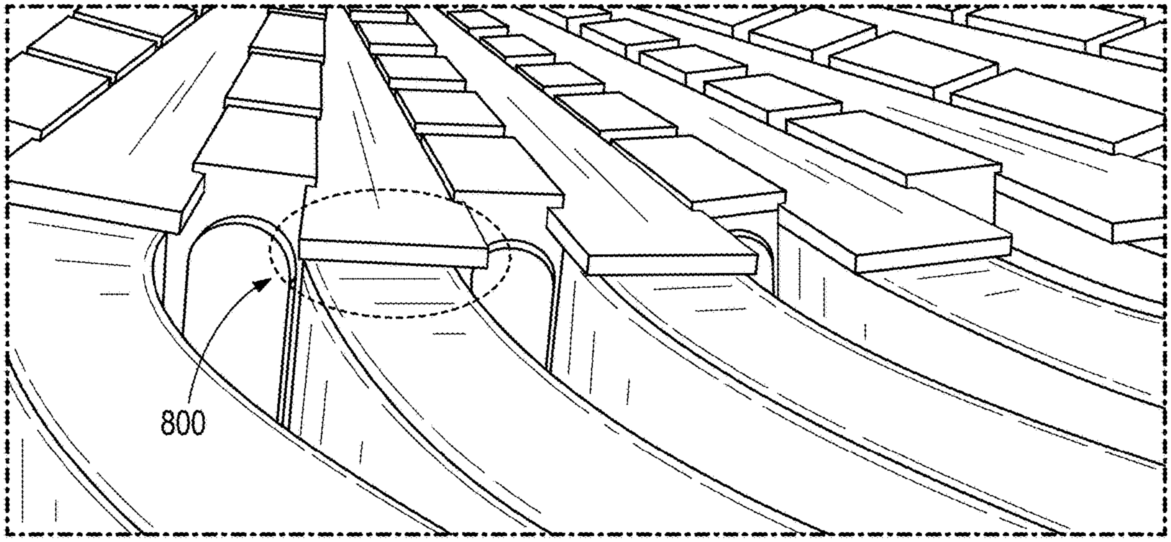
FIG. 8 illustrates a view of an example magnetic wedge design according to some embodiments of the present disclosure.
Figure 9:
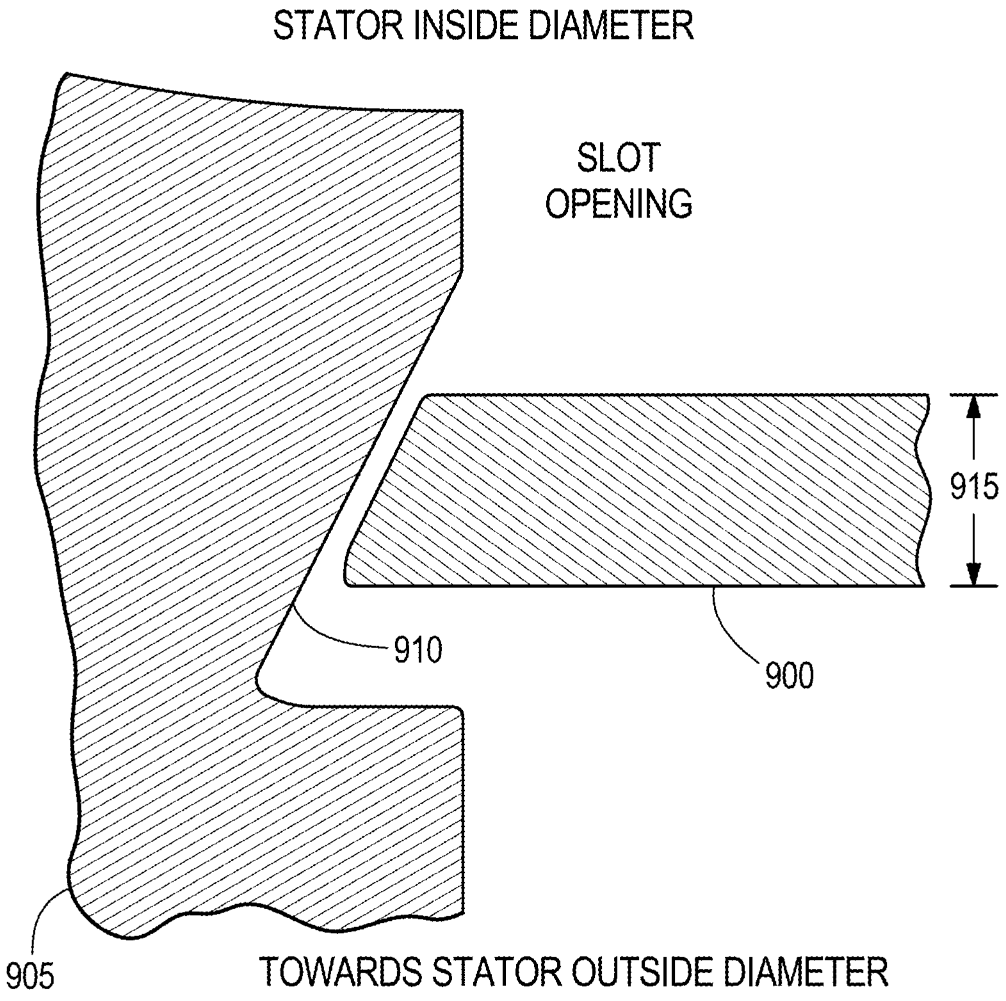
FIG. 9 illustrates a side view of an updated wedge design according to some embodiments of the present disclosure.

In some implementations, the reduction in the number of slots may increase the width of the slots. Additionally, the original OEM design experiences significant wedge failures. Wedges are implemented to hold coil windings within the respective slot. FIG. 7 provides one example of a magnetic wedge failure 700 for a wind generator. To address such failures, embodiments described herein may incorporate a new magnetic wedge for the new 48 slots. The reduced number of stator slots results in wider slots, which reduces the mechanical strength of the magnetic wedge. The shape of the magnetic wedge may impact the reliability of the wedge. For example, FIG. 8 illustrates an example original wedge 800 having round corners and a thickness of approximately 3.0 mm (0.118 in. or 118 mil). In the updated 48-slot design, the wedge 800 is replaced with a wedge 900, shown in FIG. 9, having a trapezoidal wedge profile. The wedge 900 also has an increased thickness 915, and the wedge thickness can be at least 3.8 mm (0.15 in. or 150 mil) in some constructions. In some constructions, the wedge thickness 915 of the 48-slot stator may be approximately 4.6 mm (0.181 in. or 181 mil). The wedge 900 may be situated in a corresponding trapezoidal slot in the slot opening formed by stator core 905 and a groove 910. The increase in wedge thickness and wedge shape improves the wedge strength and reliability significantly, ensuring long-term reliability and dependability.

Embodiments described herein may also use non-magnetic wedges that are not subjected to the same magnetic forces as a magnetic wedge. However, use of a non-magnetic wedge may reduce the wind generator's power factor, resulting in increased stator current, increased losses, and increased temperature rise.

FIG. 10 provides a table 1000 illustrating the change in losses between the original 60-slot stator and the updated 48-slot stator. The replacement of the stator core increases the performance and output power of the wind generator. As seen in table 1000, the updated 48-slot stator experiences a significant reduction in eddy and circulating currents. The reduction in total stator losses is significant as the stator winding temperature also decreases with the total stator losses. Overall, new stator embodiments described herein implement an innovated stator winding configuration that eliminates the need for the complex and time-consuming overhang transposition connections, reduces coil manufacturing, winding, and connection time by 30%, eliminates the need for elaborate inter-turn insulation and reduces losses by improving efficiency, reducing temperature rise, increasing insulation life, and ultimately increasing reliability and dependability of the wind generator.

The designs and methods for constructing, installing, and/or refurbishing wound stators according to the present disclosure are particularly suitable for use in wind turbine generator applications.

Various features and advantages of the aspects described herein are set forth in the following claims.

What is claimed is:

1. A stator for an electric machine, the stator comprising:

a plurality of stator slots configured to receive a plurality of coil windings; and a plurality of phases, wherein each phase includes a subset of the plurality of coil windings, wherein the plurality of stator slots includes 48 stator slots, wherein the plurality of coil windings includes 48 coil windings wherein the 48 coil windings are grouped into 24 coil groups of 2 coil windings, and wherein the subset of the plurality of coil windings includes 8 coil groups.

2. The stator of claim 1, wherein the plurality of coil windings are interleaved and wound as an eight parallel circuit delta connection.

3. The stator of claim 1, wherein each coil winding of the plurality of coil windings includes 10 turns.

4. The stator of claim 1, further comprising a trapezoidal wedge configured to hold a first coil winding of the plurality of coil windings within a respective stator slot.

5. The stator of claim 4, wherein the trapezoidal wedge has a thickness of at least 3.8 mm.

6. The stator of claim 1, wherein the stator does not include inter-coil transposition connections between the plurality of coil windings.

7. An electric machine comprising the stator of claim 1.

* * * * *